100-208
BEST AVAILABLE COPY
T. B. Webster,
Cotton Press.
No 2,111. Reissued Nov. 21, 1865.
Fig. 1.
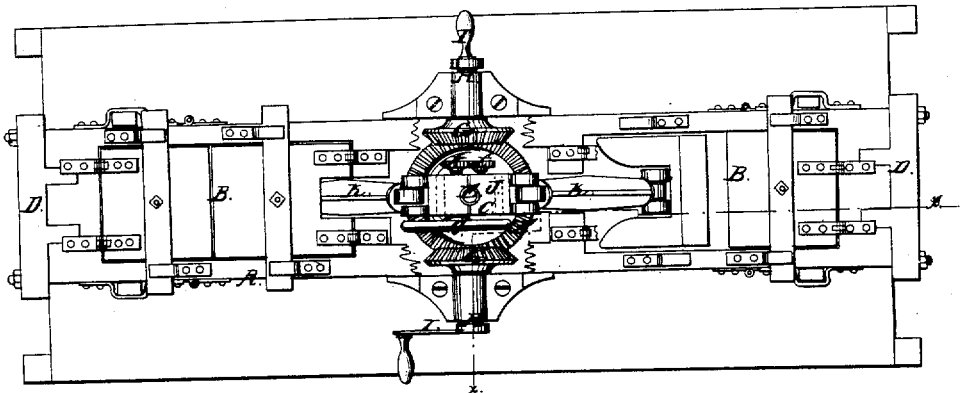
Fig. 4.
Fig. 2.
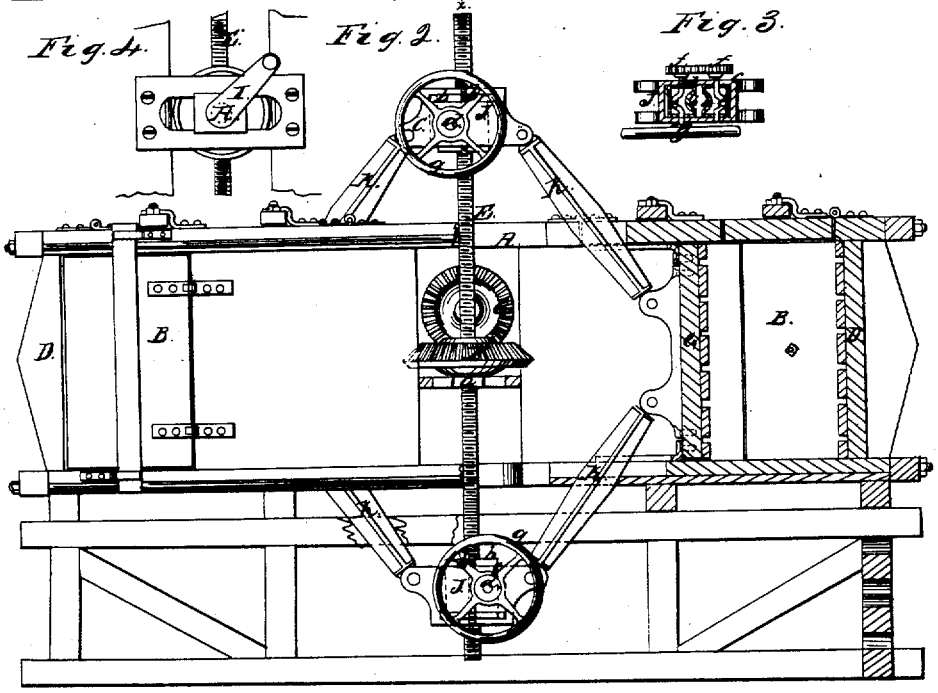
Fig. 3.
Witnesses.
W. H. Smith
J. M. Covington
Inventor.
Thos B. Webster
AM. PHOTO-LITHO. CO. N.Y. (OSBORNE'S PROCESS)

EXAMINER

UNITED STATES PATENT OFFICE.

THOMAS B. WEBSTER AND THOMAS GANNON, OF NEW YORK, N. Y., ASSIGNEES OF THOMAS B. WEBSTER.

IMPROVED SCREW-PRESS.

Specification forming part of Letters Patent No. 49,047, dated July 25, 1865; Reissue No. 2,111, dated November 21, 1865.

*To all whom it may concern:*

Be it known that we, THOMAS B. WEBSTER and THOMAS GANNON, both of the city, county, and State of New York, obtained Letters Patent No. 49,047, dated July 25, 1865, for an Improvement in Double Presses, the invention of Thomas B. Webster aforesaid; and we do hereby declare that the following is a full, clear, and exact description of the same, reference being had to the accompanying drawings, forming part of this specification, in which—

Figure 1 represents a plan or top view of a press constructed according to this invention. Fig. 2 is a longitudinal vertical section of the same, the line *x x*, Fig. 1, indicating the plane of section. Fig. 3 is a detached horizontal section of the device for releasing and closing the nuts of the screw by which the pressure is obtained; Fig. 4, a detached elevation of one of the self-adjusting boxes of the driving-shaft.

Similar letters of reference indicate corresponding parts.

This invention relates to that class of double presses in which the two followers, arranged to work toward and from each other, have the power by which the pressure is produced applied between the two.

One feature of the invention consists in an arrangement of the connections of the followers and of the bearing for the screw orequi valent means of producing the pressure, whereby an equal degree of compression of the material in both boxes of the press, irrespective of its quantity, is produced, and all the power applied comes directly against and between the two followers without being uselessly and injuriously exerted upon any part of the press.

The invention further consists in certain devices for operating in connection with a double or right-and-left-hand screw in a double press of the class hereinabove mentioned.

To enable others skilled in the art to make and use the invention, we will proceed to describe the example represented in the drawings.

A represents a box or frame, made of wood or any other suitable material. Each end of this frame forms a press-box, B, which is provided with a follower, C, moving toward and from the stationary heads D D. The said followers are operated by means of a screw-spindle, E, which extends in a vertical direction through the center of the frame A. The said spindle has its bearings in a suitable box, *a*, and it is provided with a right and left hand screw-thread, one half its length being right and the other left. On the middle of said screw-spindle, between the two threads, is firmly secured a bevel-wheel, F, which gears in two other bevel-wheels, G G, firmly secured on the inner ends of horizontal shafts H H. These shafts extend beyond the sides of the frame A, and they are provided with cranks L I, (see Fig. 1,) or pulleys, so that they can be turned freely in either direction. By these means a rotary motion can be imparted to the screw-spindle E in either direction, and the nuts J J, which are fitted on said spindle, can be made to approach each other or to move farther apart, according to the direction in which the spindle is turned. The said nuts are each composed of two jaws, *b b*, which are fitted into a head, *c*, (see Fig. 3,) so that they can be made to close up and to grasp the screw-thread. The closing up of the jaws of each nut is effected by means of two shafts, *d d*, which pass through the jaws *b b*, (see Fig. 3,) and each of which is provided with an eccentric, *e*, situated in the interior of the jaw. The said shafts have their bearings in the side plates of the head *c*, and they are geared together by small cog-wheels *f f*. A hand-wheel, *g*, secured firmly on the end of one of the shafts *d*, serves to turn the same in either direction, and the eccentrics *e* are so arranged that by turning the hand-wheel both jaws recede or close up simultaneously. By these means the nut can be thrown out of gear with the screw-spindle instantaneously, and much time is saved in working the press back. The heads *c c*, which inclose the nuts, connect by arms K K with the followers C C, as clearly shown in Fig. 2. These arms act as toggle-arms with a progressive power, which constantly increases as the nuts close up and the arms straighten out. By having the toggle-arms extended from both sides of the heads *c* the power on the screw-spindle is exactly balanced, and no lateral strain is exerted on the same, which would have a tendency to cause the nuts to bind or to bend the spindle; and, furthermore, all the power exerted by the persons turning the cranks is employed in imparting motion to the followers, so that two bales of cotton or other material are turned out simultaneously, and the operation of pressing is effected with comparatively little exertion and with great dispatch.

In order to prevent an unequal strain on the screw-spindle and to compress equally the material in both of the press-boxes B B, if more material should be in one of the said boxes than in the other, the box *a*, which forms the bearings for the screw-spindle and also the bearing-boxes of the driving-shafts H, are yielding or self-adjusting in a horizontal direction, so that all of the solid boxes or bearings can accommodate themselves to the quantity of material in each of the press-boxes B B and permit the screw and driving-shafts always to come to a central position between the followers. This makes each follower serve as an abutment to the other in the pressing operation and all lateral strain upon and tendency to bend the screw-spindle is avoided, and the contents of both of said boxes B B are brought to the same density.

The press is very simple in its construction. It is light and requires little machinery. The working parts are relieved from friction as much as possible, and the power is exerted to the best advantage. The material to be pressed is readily introduced into the boxes, which are provided with doors on the top and sides, as shown in the drawings, and through these doors the bales, when completed, can be readily removed; and, finally, by throwing the nuts out of gear with the spindle, the followers can be worked back instantaneously, and no time is lost in performing this operation.

Having thus described the invention, we will proceed to state what we claim as new and desire to secure by Letters Patent.

1. In a double press having its followers arranged to work toward and from each other, the arrangement of the two followers and their connections, and of the bearing of the screw, whereby the said bearing is rendered self-adjusting or free to assume a central position between the followers, and each follower serves as the abutment to the other in the pressing operation, substantially as herein described.

2. In a press provided with a right-and-left-hand screw-spindle, E, the gear-wheels F G and cranks L I or their equivalents, in combination with heads *c*, detachable nuts J J, toggle-arms K K, and followers C C, situated on opposite sides of the spindle, all as herein shown and described.

3. The eccentric-shafts *d d*, geared together by cog-wheels *f f*, and operated by a hand-wheel, *g*, or its equivalent, in combination with the jaws *b b*, spindle E, and followers C C, constructed and operating substantially as and for the purpose specified.

THOMAS B. WEBSTER.
THOS. GANNON.

Witnesses:
HENRY T. BROWN,
I. W. COOMBS.